United States Patent
Ivory et al.

(10) Patent No.: US 7,499,535 B1
(45) Date of Patent: Mar. 3, 2009

(54) METHOD TO AUTOMATICALLY CONNECT A MEETING ROOM PHONE TO A CONFERENCE CALL

(75) Inventors: Andrew J. Ivory, Wake Forest, NC (US); Aaron K. Shook, Raleigh, NC (US); Erik J. Burckart, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/030,380

(22) Filed: Feb. 13, 2008

(51) Int. Cl.
  *H04M 3/42* (2006.01)
(52) U.S. Cl. ............... 379/202.01; 379/201.06; 379/204.01; 379/205.01
(58) Field of Classification Search ............ 379/202.01, 379/204.01, 205.01, 201.01, 201.02, 201.06, 379/201.07
  See application file for complete search history.

(56) References Cited

U.S. PATENT DOCUMENTS

| | | | |
|---|---|---|---|
| 6,363,352 | B1 | 3/2002 | Dailey et al. |
| 2004/0218744 | A1 | 11/2004 | Nguyen et al. |
| 2005/0018826 | A1 | 1/2005 | Benco et al. |
| 2005/0227680 | A1 * | 10/2005 | Snowden ............ 455/416 |
| 2006/0062367 | A1 | 3/2006 | Christenson et al. |
| 2006/0168529 | A1 | 7/2006 | Rokosz et al. |
| 2007/0081651 | A1 | 4/2007 | Iyer et al. |
| 2007/0182546 | A1 * | 8/2007 | Virk et al. ............ 340/539.13 |
| 2007/0263825 | A1 | 11/2007 | Shah et al. |
| 2007/0280459 | A1 * | 12/2007 | Yee et al. ............ 379/201.01 |

FOREIGN PATENT DOCUMENTS

JP  2006-171825  6/2006

* cited by examiner

*Primary Examiner*—Thjuan K Addy
(74) *Attorney, Agent, or Firm*—Carpenter & Assoc.; Robert K. Carpenter

(57) ABSTRACT

Connecting a meeting room telephone to a conference call, including: parsing a user's calendar entry to determine a room where a conference is scheduled, a meeting start time, and a conference call telephone number; querying a room reservation system for a telephone number for a meeting room telephone; waiting until detecting an attendee entering the room; in response to the attendee, other than a meeting chairperson, entering, connecting the telephone to the call with a participant passcode, other that a chairperson passcode; and detecting the chairperson entering the room, and in response thereto, automatically re-dialing the number and/or renegotiating the call utilizing the chairperson passcode; if the telephone is not connected to the call when the chairperson enters the room, automatically detecting that the chairperson has entered the room and, in response thereto, connecting the telephone to the call utilizing the chairperson passcode.

1 Claim, 2 Drawing Sheets

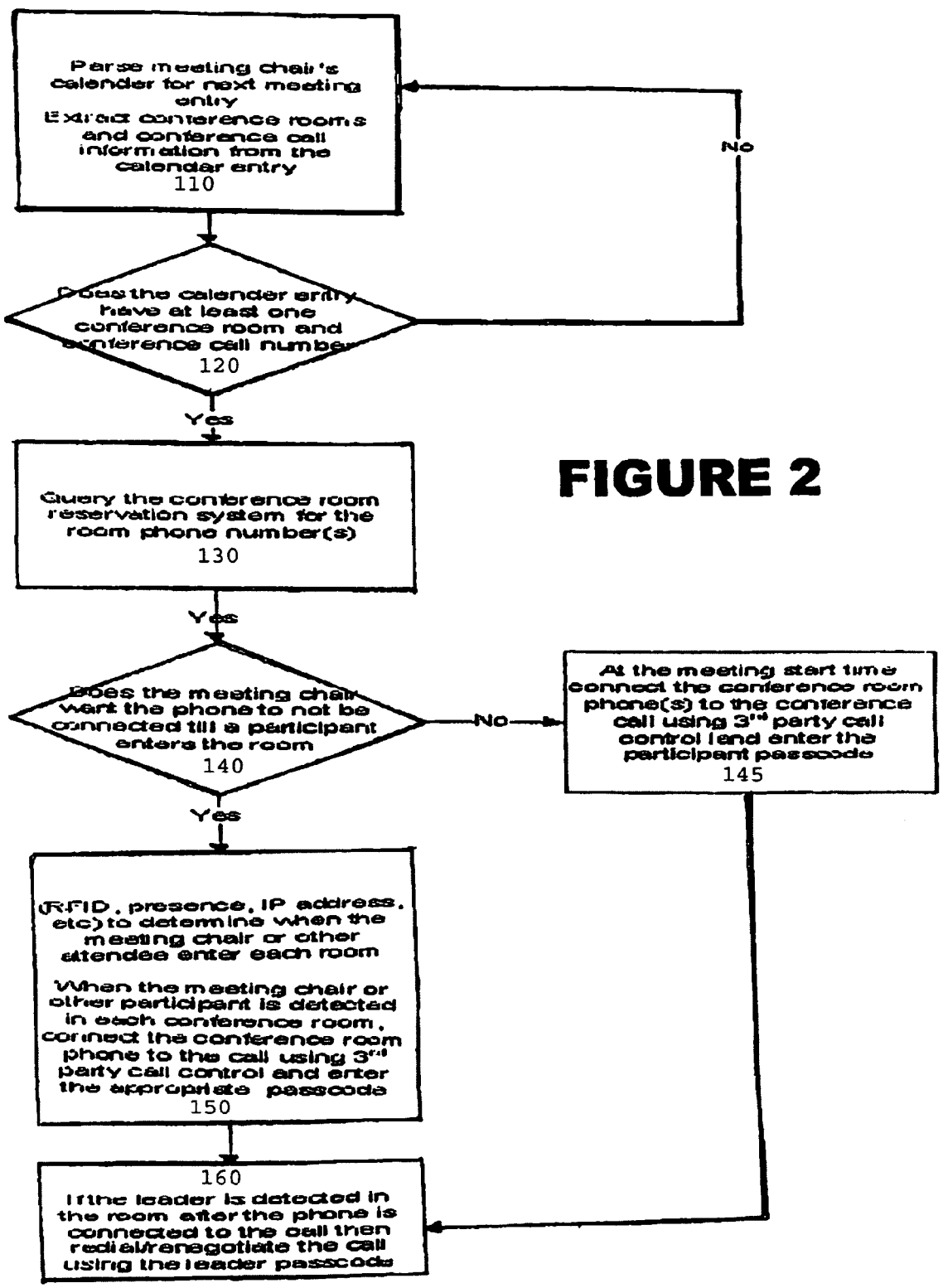

METHOD TO AUTOMATICALLY CONNECT A MEETING ROOM PHONE TO A CONFERENCE CALL

CROSS-REFERENCE TO RELATED APPLICATIONS (Not Applicable)

Figure 1:
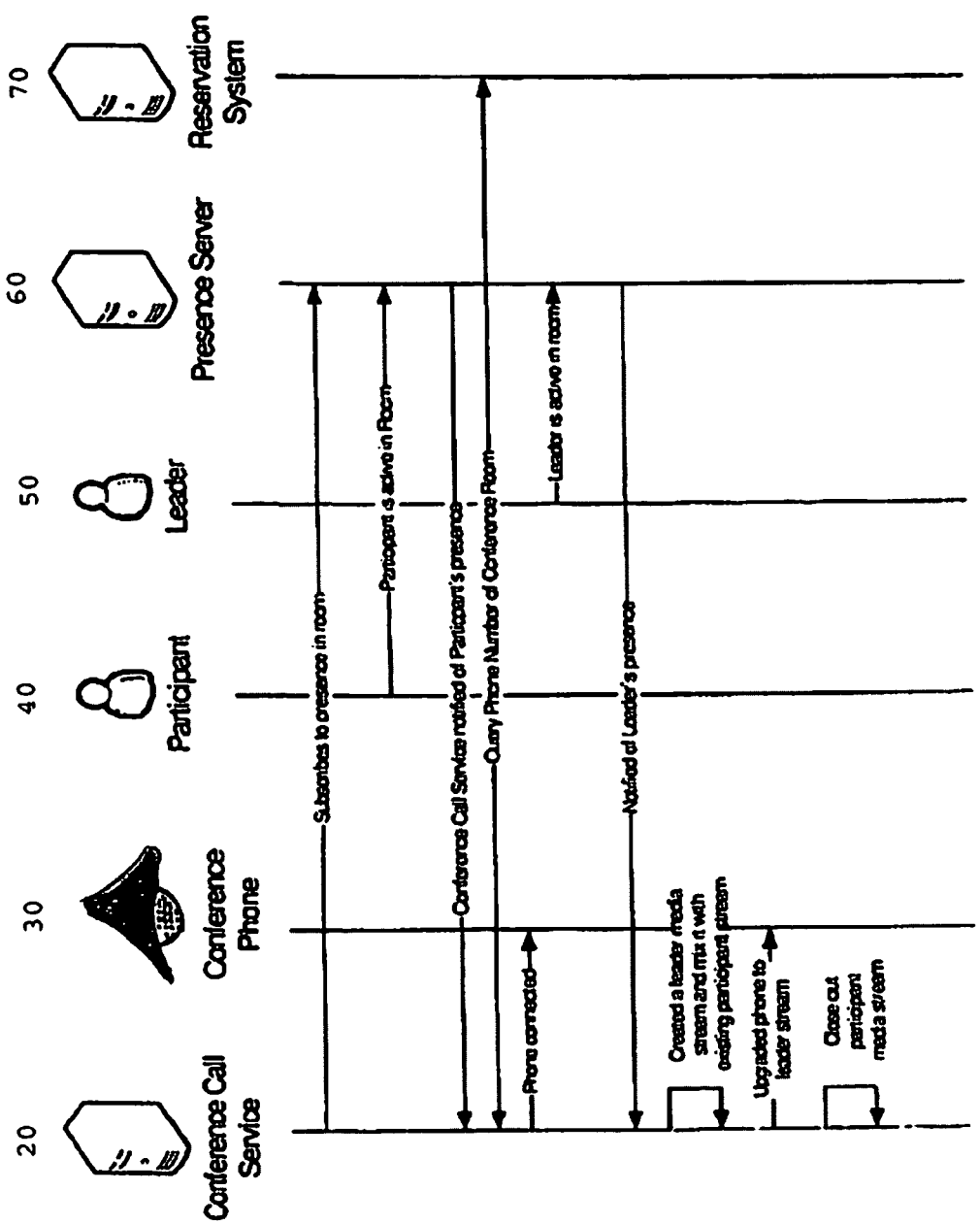

STATEMENT REGARDING FEDERALLY SPONSORED RESEARCH OR DEVELOPMENT (Not Applicable)

THE NAMES OF THE PARTY TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION (1) Field of the Invention

This disclosure is directed to a method of automatically connecting a meeting room telephone to a conference call.

(2) Description of Related Art Including Information Submitted under 37 CFR 1.97 and 1.98

Rokosz et al. (U.S. Patent Publication No. 20060168529) describes integrated management of in-person and virtual meeting attendance. According to the abstract, Rokosz et al. is directed to a "method, system and apparatus for the integrated management of in-person and e-meeting attendance . . . [and a] system for the consolidated management of an attendance list for a hybrid meeting can include a collaborative bridge configured for coupling both to an in-person meeting and an e-meeting, a data store of integrated attendance, and attendance integration logic . . . [and] the in-person meeting can include a sensor coupled to the collaborative bridge and configured to detect a presence of tags affixed to participants to the in-person meeting to manage the attendance information for the in-person meeting . . . [and as] an example, the sensor and tags can be a radio frequency identification (RFID) sensor and corresponding RFID tags, a badge reader and corresponding badges, or at least one wireless access point and corresponding wireless transmitters."

Iyer et al. (U.S. Patent Publication No. 20070081651) discloses a "telecommunications system [that] includes a plurality of user devices; a presence and availability service configured to monitor presence states of the plurality of user devices; a teleconferencing service configured to permit a scheduling of conferences among the plurality of users; wherein said teleconferencing service is configured to invoke a scheduled teleconference responsive to presence states of the plurality of user devices" (see the Iyer et al. abstract).

BRIEF SUMMARY OF THE INVENTION

At least some aspects and embodiments of this disclosure are directed to a method of automatically connecting a meeting room telephone to a conference call.

In particular, at least some aspects and embodiments of this disclosure are directed to a method for connecting a meeting room telephone to a conference telephone call, including: parsing a user's calendar entry to determine a meeting room where a conference is scheduled, a meeting start time, and a conference call telephone number; querying a conference room reservation system to look up a telephone number for a telephone in the meeting room; waiting until detection is made that a meeting attendee has entered the meeting room; in response to the attendee, other than a meeting chairperson, entering the meeting room, connecting the telephone to the conference telephone call with a participant passcode, other than a meeting chairperson passcode; and detecting that the meeting chairperson has entered the meeting room, and in response to the meeting chairperson entering the meeting room, automatically re-dialing the conference call telephone number and/or renegotiating the conference telephone call utilizing the meeting chairperson passcode; if the telephone is not connected to the conference telephone call when the meeting chairperson enters the room, automatically detecting that the meeting chairperson has entered the meeting room and, in response to the detecting that the meeting chairperson has entered, connecting the telephone to the conference telephone call utilizing the meeting chairperson passcode.

Other aspects and embodiments of this disclosure are directed to a system for automatically connecting a meeting room telephone to a conference call.

Still other aspects and embodiments of this disclosure are directed to an apparatus for automatically connecting a meeting room telephone to a conference call.

Additional aspects and embodiments of this disclosure are directed to storage media or a storage medium that stores a computer program or programs or the like for the methods and/or systems disclosed herein for automatically connecting a meeting room telephone to a conference call.

Other exemplary embodiments and advantages of this disclosure can be ascertained by reviewing the present disclosure and the accompanying drawings.

BRIEF DESCRIPTION OF THE SEVERAL VIEWS OF THE DRAWING(S)

This disclosure is further described in the detailed description that follows, with reference to the drawings, in which:

FIG. 1 is a chart illustrating a system for automatically connecting a meeting room telephone to a conference call, in accordance with at least some aspects and embodiments of this disclosure; and FIG. 2 is a flow chart illustrating a method for automatically connecting a meeting room telephone to a conference call, in accordance with at least some aspects and embodiments of this disclosure.

DETAILED DESCRIPTION OF THE INVENTION

Exemplary embodiments of this disclosure are described herein by way of example. In particular, this disclosure is directed to a method of automatically connecting a meeting room telephone to a conference call.

When a meeting chair (or chairperson or leader) schedules a meeting with participants that will be both onsite as well as remote, the meeting chair will often reserve a conference room as well as include a conference call number in the invitation. When the chair arrives at the reserved conference room he/she must then look up the conference call number and leader passcode and then dial into the conference call utilizing the phone in the reserved conference room. Meetings can be delayed due to the meeting chair having to look up the conference call number, or when the chair is running late or a previous meeting in the conference room has run over.

Aspects of this disclosure are directed to a method and system that can parse a user's current calendar entry to determine the meeting room(s) where a meeting is scheduled and conference call number for the meeting. The system can then query the conference room reservation system to look up the phone number for each conference room. This method and system can then optionally connect the conference room phone for each room to the conference call utilizing third party call control at the meeting start time or wait until the system has detected that the chair or another attendee has entered each meeting room, for example utilizing technology such as RFID, presence, IP address, etc. If the conference room phone is already connected to the call utilizing the participant passcode when the meeting chair enters, the system can automatically re-dial/renegotiate utilizing the leader passcode.

FIG. 1 illustrates an exemplary embodiment of a system and method in accordance with aspects of this disclosure. FIG. 1 shows a conference call service system 20 that can query the telephone number of a conference room phone 30 from room reservation system 70, and that can communicate with presence server 60, which can determine the presence of meeting participant(s) 40 and the meeting leader 50. The conference call service system 20 can connect the conference room phone 30 to the conference call based on the determined presence of a participant 40 and/or the meeting leader 50. The conference call service system 20 can also renegotiate an already begun conference call when the leader 50 arrives at the conference room utilizing the leader 50 passcode.

FIG. 2 is a flowchart illustrating an exemplary embodiment of a method in accordance with at least some aspects of this disclosure. In FIG. 2, at 110, a meeting chair's calendar is parsed for a next meeting entry and conference room (for example room number) and conference call information (for example participant telephone number and leader passcode).

At 120, it is determined whether the calendar entry has at least one conference room and conference call number. If not, the system can check later (at 120) to see if there is at least one conference room and conference call number. If yes, at 130, the conference room telephone number can be obtained from the conference room reservation system. Step 130 could also be done earlier in conjunction with 110, for example.

At 140, it is determined whether the meeting chair desires the conference room telephone to only become connected to the conference call once a participant has entered the meeting room.

If yes, at 150, a determination is made, for example utilizing RFID, presence, IP address, etc. that the meeting chair and/or another attendee has entered (or is entering) the conference room. When it is determined the meeting chair has entered (or is entering) the conference room, the conference room phone is connected to the conference call with third party control and the appropriate leader passcode (if the leader is present). If the leader is not present, in response to the leader becoming present, at 160, the conference room telephone can be reconnected, or the call can be renegotiated with the leader passcode.

Back at 140, if meeting chair desires to connect the conference room telephone to the conference call regardless of the presence of any participants, at 145, at the meeting start time, the conference room telephone is connected to the conference call with third party call control with the participant passcode. Thereafter, once a determination is made that the leader is present, at 160, the conference room telephone can be reconnected, or the call can be renegotiated with the leader passcode.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

What is claimed:

1. A method for connecting a meeting room telephone to a conference telephone call, comprising:

parsing a user's calendar entry to determine a meeting room where a conference is scheduled, a meeting start time, and a conference call telephone number;

querying a conference room reservation system to look up a telephone number for a telephone in the meeting room;

waiting until detection is made that a meeting attendee has entered the meeting room;

in response to the attendee, other than a meeting chairperson, entering the meeting room, connecting the telephone to the conference telephone call with a participant passcode, other than a meeting chairperson passcode; and, detecting that the meeting chairperson has entered the meeting room, and in response to the meeting chairperson entering the meeting room, automatically re-dialing the conference call telephone number and/or renegotiating the conference telephone call utilizing the meeting chairperson passcode;

if the telephone is not connected to the conference telephone call when the meeting chairperson enters the room, automatically detecting that the meeting chairperson has entered the meeting room and, in response to the detecting that the meeting chairperson has entered, connecting the telephone to the conference telephone call utilizing the meeting chairperson passcode.

* * * * *